(12) United States Patent
Park (10) Patent No.: US 11,814,894 B2
(45) Date of Patent: Nov. 14, 2023

(54) SWING-IN TYPE DOOR STRUCTURE OF VEHICLE

(71) Applicants: HYUNDAI MOTOR COMPANY, Seoul (KR); Kia Corporation, Seoul (KR)

(72) Inventor: Seung Young Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 39 days.

(21) Appl. No.: 17/542,230

(22) Filed: Dec. 3, 2021

(65) Prior Publication Data
US 2022/0341253 A1    Oct. 27, 2022

(30) Foreign Application Priority Data

Apr. 26, 2021    (KR) .................. 10-2021-0053630

(51) Int. Cl.
*E05D 15/30*    (2006.01)
*E06B 3/50*    (2006.01)

(52) U.S. Cl.
CPC ............ *E06B 3/5072* (2013.01); *E05D 15/30* (2013.01); *E05Y 2201/668* (2013.01); *E05Y 2201/682* (2013.01); *E05Y 2201/684* (2013.01); *E05Y 2900/532* (2013.01)

(58) Field of Classification Search
CPC . E06B 3/5072; E06B 3/362; E05Y 2201/668; E05Y 2201/682; E05Y 2201/684; E05Y 2900/532; E05D 3/00; E05D 15/02; E05D 15/42; E05D 15/44; B60J 5/047; B60J 5/0468; B60J 5/0497; F16C 11/06; B60Y 2306/09; B60Y 2410/125; E06D 15/30
See application file for complete search history.

(56) References Cited

U.S. PATENT DOCUMENTS

| | | | | |
|---|---|---|---|---|
| 3,462,881 A | * | 8/1969 | Kristupas ............... | E05F 17/004 49/111 |
| 4,282,686 A | * | 8/1981 | Britzke .................... | B60J 5/062 49/334 |
| 6,125,768 A | * | 10/2000 | Kurnik .................... | E05F 15/63 49/108 |
| 8,371,638 B2 | * | 2/2013 | Heidrich ............... | E05F 15/614 296/146.13 |
| 9,797,171 B2 | * | 10/2017 | Takahashi ............. | E05B 83/363 |

(Continued)

*Primary Examiner* — Janet M Wilkens
*Assistant Examiner* — Susan M. Heschel
(74) *Attorney, Agent, or Firm* — MORGAN, LEWIS & BOCKIUS LLP (57) ABSTRACT

An embodiment of the present disclosure provides a swing-in type of door structure of a vehicle that includes a door disposed in parallel at both sides of an entrance of a vehicle, and a door arm mounted on one side of the door to open or close the door by rotation, including: a center door bracket of which one end is fixed to one surface of an upper center of the door and that extends in a direction perpendicular to the door; a roller bracket of which one end is coupled to the other end of the center door bracket in a direction perpendicular to the center door bracket; and a roller mounted on the other end of the roller bracket and coupled to be rolled and rotated while in contact with a rail formed on a vehicle body of an upper side of the door.

14 Claims, 12 Drawing Sheets

(56) References Cited

U.S. PATENT DOCUMENTS

2005/0121939 A1\* 6/2005 Griffis ..................... E06B 7/21
　　　　　　　　　　　　　　　　　　　　296/146.4
2020/0191195 A1\* 6/2020 Honda ................. F16J 15/3232
2020/0248494 A1\* 8/2020 Pujol Oller ............ E05F 15/63

\* cited by examiner

FIG. 1

– Related Art –

FIG. 2

- Related Art -

SWING-IN TYPE DOOR STRUCTURE OF VEHICLE

CROSS-REFERENCE TO RELATED APPLICATION

This application is based on and claims the benefit of priority to Korean Patent Application No. 10-2021-0053630, filed Apr. 26, 2021, in the Korean Intellectual Property Office, the disclosure of which is incorporated herein in its entirety by reference.

TECHNICAL FIELD

The present disclosure relates to a swing-in type of door structure of a vehicle, and more particularly, to a swing-in type of door structure of a vehicle that may easily adjust a step difference of a swing-in type of door.

BACKGROUND

Generally, a double swing-in type of door applied to a vehicle, such as a low-floor bus, may result in a wider entrance than a general foldable door because the double swing-in type of door installed to an entrance of the vehicle is opened and closed while rotating to the inside of the entrance. In addition, it has a simple structure, excellent durability, and an attractive price compared to other types of doors, so it is widely applied to urban buses globally.

Figure 1:
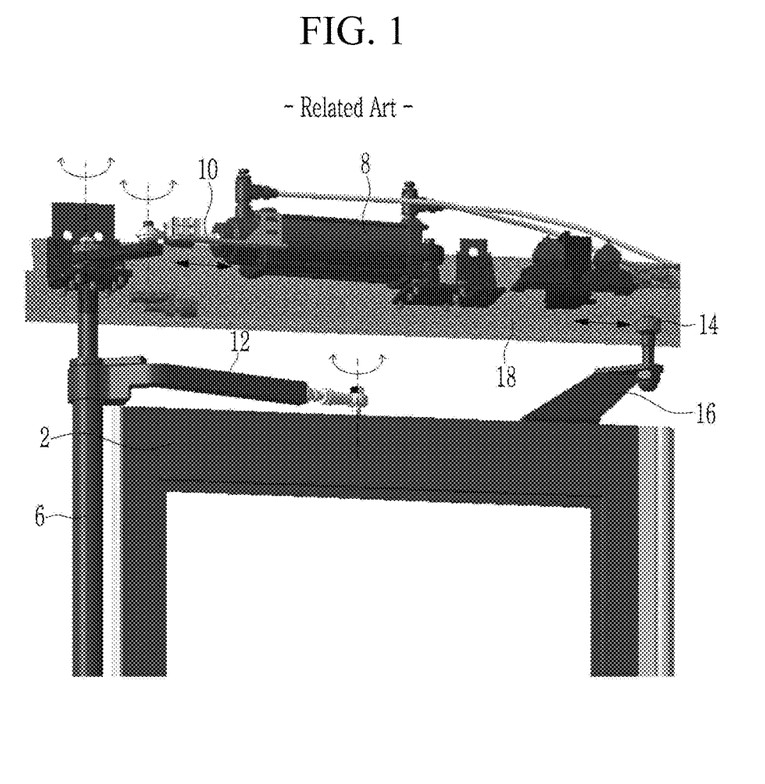
FIG. 1 illustrates a swing-in type of door structure applied to an existing vehicle, viewed from the inside of the vehicle.
Figure 2:
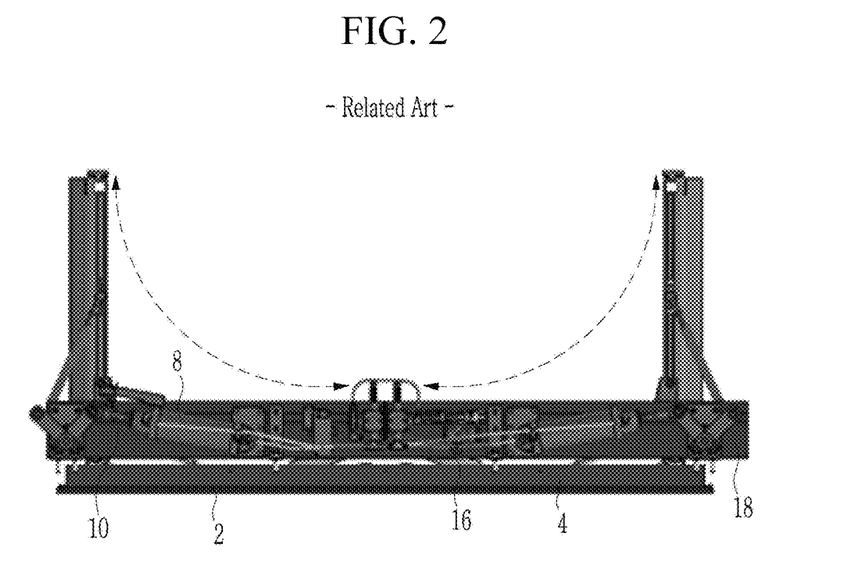
FIG. 2 is a top view in which a swing-in type of door structure applied to an existing vehicle is illustrated along with an operational trajectory thereof.

Referring to FIG. 1 and FIG. 2, a vehicle to which an existing double swing-in door is applied is provided with doors 2 and 4 arranged parallel at both sides of a vehicle entrance, a door arm 6 is mounted on one side of the door 2, and an opening/closing device for opening and closing the door 2 by rotation of the door arm 6 is provided. A door arm and an opening/closing device are also provided at the right side symmetrically with the door 2.

In the swing-in door opening/closing device, the door 2 is opened and closed by an air cylinder 8 operated by an electric switch. And in this case, a linear motion due to the driving force of the air cylinder 8 is converted into a rotational motion of the door arm 6 to open and close the door 2. A connecting rod 10 is disposed in the air cylinder 8 so as to move linearly. As the connecting rod 10 moves linearly due to the driving force of the air cylinder 8, the door arm 6 rotates so that the door 2 is opened or closed. In this case, a guide arm 12 connected between the door arm 6 and an upper end of the door 2 is configured to be slidable from the upper end of the door 2 so that the door 2 may be rotated. In addition, a roller 14 and a bracket 16 are provided at the upper end of the door 2 so that the roller contacts a door vehicle body so as to rotate, so that as the door 2 rotates, the roller rotates along the door vehicle body and thus the door is opened and closed.

However, in the process of assembling the swing-in door opening/closing device, a gap may occur between the door vehicle body and the upper end of the door, and the engagement between both doors 2 and 4 may be misaligned. In addition, sealing between the doors 2 and 4 and the vehicle bodies of the doors 2 and 4 in a vehicle body width direction may not be completely formed.

The above gaps not aesthetically pleasing and may permit dust and outside air to flow into the vehicle, and noise such as wind noise may occur, and can lead to a vehicle having poor quality.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to a swing-in type of door structure of a vehicle that may absorb an assembly dispersion of a vehicle and finely adjust a step difference of a vehicle door.

An embodiment of the present disclosure provides a swing-in type of door structure of a vehicle that includes a door disposed in parallel at both sides of an entrance of the vehicle, and a door arm mounted on one side of the door to open or close the door by rotation, including: a center door bracket may have one end to be fixed to one surface of an upper center of the door and that extends in a direction perpendicular to the door; a roller bracket may have one end coupled to the other end of the center door bracket in a direction perpendicular to the center door bracket; and a roller mounted on the other end of the roller bracket and coupled to be rolled and rotated while in contact with a rail on a vehicle body of an upper side of the door.

The roller bracket may include: a first roller bracket coupled to the center door bracket, and a second roller bracket extending integrally with the first roller bracket and coupled to the roller; and a radius of the first roller bracket is larger than a radius of the second roller bracket, where both radii may be along a horizontal direction of the vehicle.

A central axis of the first roller bracket may be eccentric with respect to a central axis of the second roller bracket.

The central axis of the first roller bracket may be spaced apart from the central axis of the second roller bracket by a distance of from 4 mm to 6 mm.

The swing-in type of door structure of the vehicle may further include a center door bracket fixing bolt. One end of the first roller bracket may be fixed to the other end of the center door bracket by the center door bracket fixing bolt.

The swing-in type of door structure of the vehicle may further include: an upper door bracket having one end to fix to an upper surface of the door between the door arm and the center door bracket and extending in a direction perpendicular to the door; a shaft pin mounted in a direction perpendicular to the upper door bracket so as to pass through the upper door bracket; and an upper guide arm having one end rotatably coupled to one end of the shaft pin and the other end to fix to the door arm to extend in a horizontal direction to the door.

The swing-in type of door structure of the vehicle may further include an upper door bracket fixing bolt. The one end of the upper door bracket may be fixed to the upper surface of the door by the upper door bracket fixing bolt.

The shaft pin may pass through an upper door bracket opening in the upper door bracket, and the upper door bracket may be fixedly mounted by nuts at both sides of the upper door bracket opening.

The one end of the upper guide arm may have an upper guide arm opening into which the shaft pin is inserted, and the upper guide arm opening may have a rotating joint that is to be rotated in the upper guide arm opening and that is fixed to one end of the shaft pin.

The one end of the shaft pin may have a locking protrusion to allow the shaft pin to be locked to an inlet side of the upper guide arm opening into which the shaft pin is inserted.

The swing-in type of door structure of the vehicle may further include a shaft pin fixing bolt. The one end of the shaft pin and the one end of the upper guide arm may be coupled by the shaft pin fixing bolt.

The swing-in type of door structure of the vehicle may further include: a lower door bracket having one end to be fixed to a lower side of a door-side vehicle body and the other end to be coupled to a lower end of the door arm; and a lower guide arm having one end to be rotatably coupled to the lower end of the door arm and the other end to be fixed to a lower surface of the door.

The swing-in type of door structure of the vehicle may further include a lower door bracket fixing bolt. The one end of the lower door bracket may have an upper long hole, and the lower door bracket fixing bolt may be inserted into the upper long hole so that the lower door bracket may be fixed to a lower side of the door-side vehicle body.

The one end of the lower guide arm may be interposed and coupled between the other end of the lower door bracket and a lower end of the door arm, the other end of the lower door bracket may have a lower long hole, and a lower guide arm fixing bolt may pass through and be inserted into the lower long hole so that the lower door bracket and the lower guide arm may be bolted to the lower end of the door arm.

The swing-in type of door structure of the vehicle may further include a fixing pin. The fixing pin may pass through and be coupled to the other end of the lower guide arm, and the fixing pin may be rotatably inserted into a fixing pin inserting member on a lower surface of the door.

According to the embodiment of the present disclosure, in a swing-in type of door structure of a vehicle, by finely adjusting a step difference of a vehicle door to minimize a gap around the door, it is possible to prevent dust and the like from being introduced into the vehicle, and it is possible to minimize the generation of wind noise.

In addition, by adjusting a bolt or nut, it is possible to easily adjust the step difference in a direction perpendicular to the door and in a vehicle width direction, thereby realizing a watertight structure.

DETAILED DESCRIPTION

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Further, with embodiments of the present disclosure, detailed description is made as to the constituent elements in a first embodiment with reference to the relevant drawings by using the same reference numerals for the same constituent elements, while only constituent elements different from those related to the first embodiment are described in other embodiments.

The drawings are schematic, and are not illustrated in accordance with a scale. Relative dimensions and ratios of portions in the drawings are illustrated to be exaggerated or reduced in size for clarity and convenience, and the dimensions are just examples and are not limiting. In addition, like structures, elements, or components illustrated in two or more drawings use same reference numerals for showing similar features. It will be understood that when an element such as a layer, film, region, area, or substrate is referred to as being "on" another element, it can be directly on the other element or intervening elements may also be present.

In the disclosure, the terms "lower" or "upper", "vertical" or "horizontal", and the like may describe features of the embodiments with reference to the positions of features as displayed in the figures.

The embodiments of the present disclosure include example embodiments of the present disclosure in detail. As a result, various modifications of the drawings will be expected. Therefore, the embodiments are not limited to a specific shape of an illustrated region, but, for example, include a change in the shape in accordance with manufacturing.

Hereinafter, a swing-in type of door structure of a vehicle according to an embodiment of the present disclosure will be described in detail with reference to the accompanying drawings.

Figure 3:
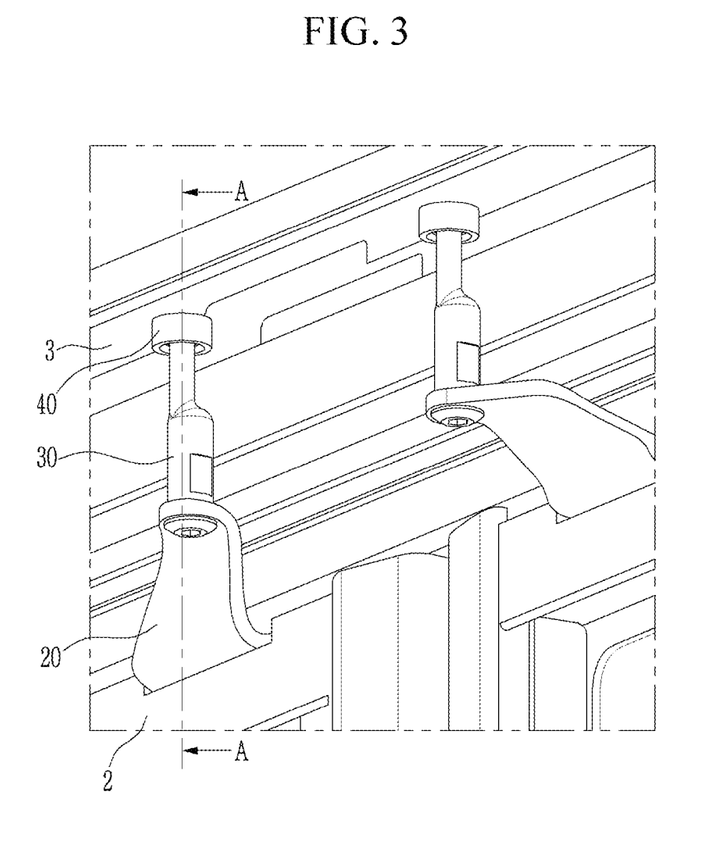
FIG. 3 illustrates a center portion of a swing-in type of door structure of a vehicle according to an embodiment of the present disclosure.

FIG. 3 illustrates a center portion of a swing-in type of door structure of a vehicle according to an embodiment of the present disclosure.

Referring to FIG. 3, a swing-in type of door structure of a vehicle according to an embodiment of the present disclosure is a swing-in type of door structure including a door 2 disposed in parallel at both sides of an entrance of a vehicle and a door arm 6 mounted at one side of the door 2 to allow the door to be opened and closed by rotation, and includes a center door bracket 20, a roller bracket 30, and a roller 40.

The center door bracket 20 has a bent plate shape, and one end thereof is attached and fixed to one side of an upper center of the door 2 and extends in a direction perpendicular to the door 2. That is, one end of the center door bracket 20 is fixed to the door 2 of the inside of the vehicle, and is extended toward the inside of the vehicle.

One end of the roller bracket 30 is coupled to the other end of the center door bracket 20 extending toward the inside of the vehicle in a direction perpendicular to the center door bracket 20. The roller bracket 30 extends toward an upper portion of the vehicle in a direction parallel to the door 2.

The roller 40 is mounted on the other end of the roller bracket 30, and may be coupled to the roller bracket 30 so as to be rolled and rotated while in contact with a rail 3 formed on a vehicle body of an upper side of the door 2. When the door 2 is opened or closed, the center door bracket 20 attached and fixed to the door 2 is moved together with the door 2, and the roller bracket 30 and the roller 40 coupled to the center door bracket 20 are moved. In this case, the roller 40 may be rolled and rotated while in contact with the rail 3 formed on the vehicle body of the upper side of the door 2.

Figure 4:
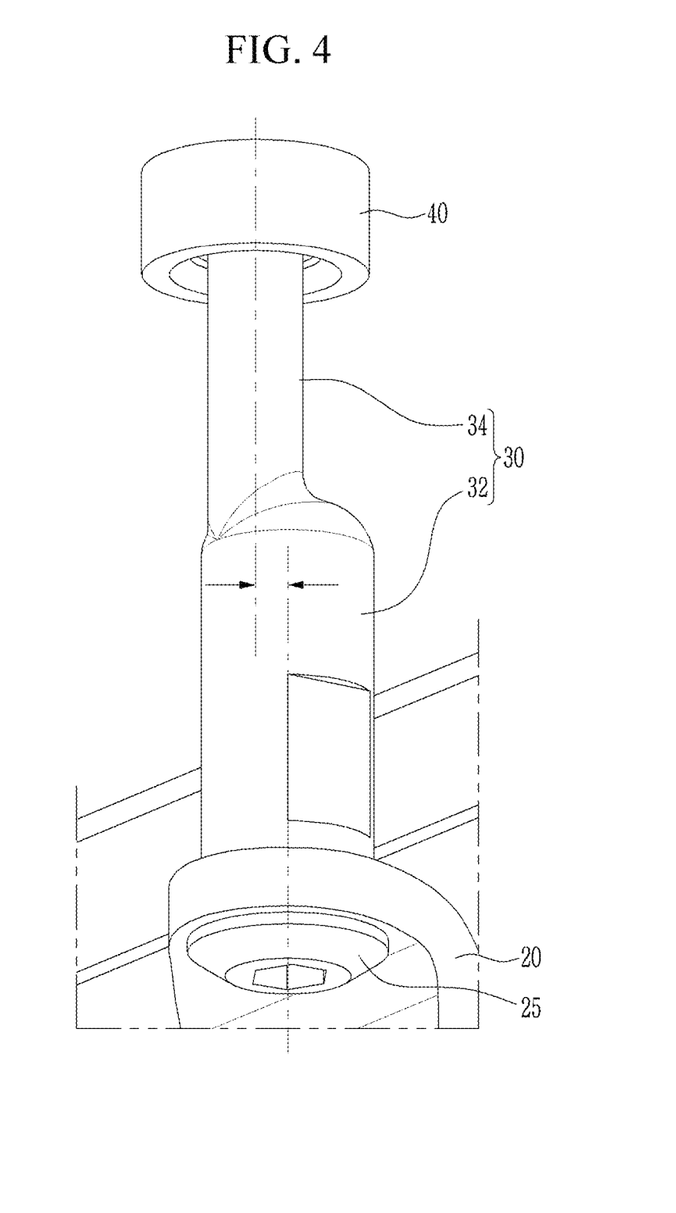
FIG. 4 illustrates a coupling state between a center door bracket and a roller bracket of a swing-in type of door structure of a vehicle according to an embodiment of the present disclosure.
Figure 5A:
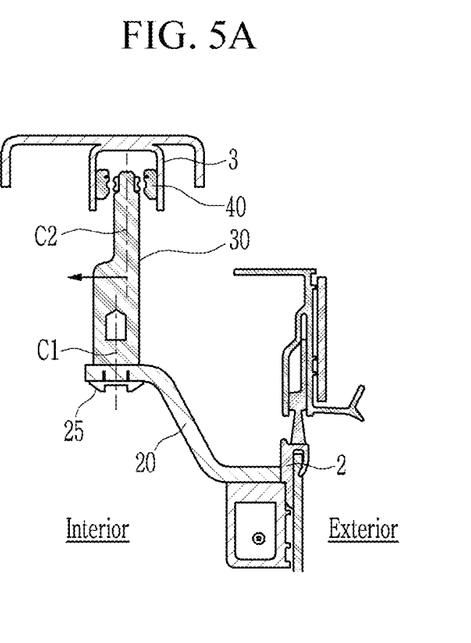
FIGS. 5A and 5B illustrate a cross-sectional view taken along line AA of FIG. 3 illustrating an operational state of a center portion of a swing-in type of door structure of a vehicle according to an embodiment of the present disclosure.
Figure 5B:
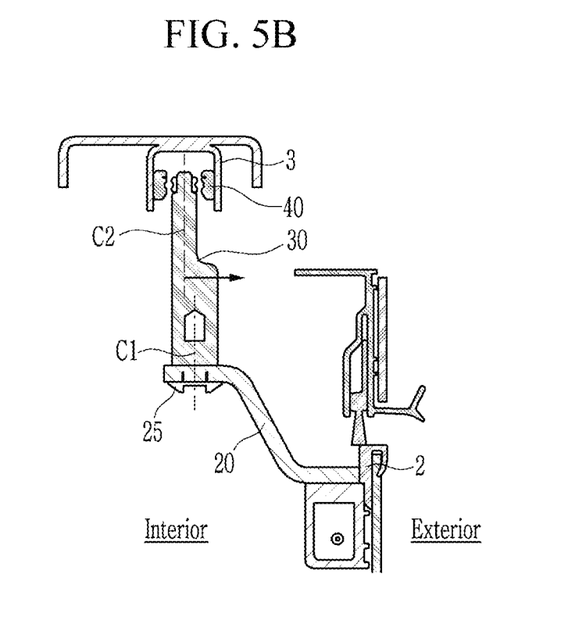

FIG. 4 illustrates a coupling state between a center door bracket and a roller bracket of a swing-in type of door structure of a vehicle according to an embodiment of the present disclosure. FIGS. 5A and 5B illustrate a cross-sectional view taken along line AA of FIG. 3 illustrating an operational state of a center portion of a swing-in type of door structure of a vehicle according to an embodiment of the present disclosure.

Referring to FIG. 4, the roller bracket 30 includes a first roller bracket 32 and a second roller bracket 34. The first roller bracket 32 is coupled to the other end of the center door bracket 20 by a center door bracket fixing bolt 25, and the second roller bracket 34 extends integrally with the first roller bracket 32 and is coupled to the roller 40. The roller 40 may be rotatably coupled to an outer circumferential surface of the second roller bracket 34.

The first roller bracket 32 and the second roller bracket 34 may be formed to have a substantially circular cylinder shape, and a horizontal direction radius of the vehicle of the first roller bracket 32 may be larger than that of the vehicle of the second roller bracket 34.

In addition, referring to FIGS. 5A and 5B, a central axis C1 of the first roller bracket 32 and a central axis C2 of the second roller bracket 34 may be eccentric. The central axis C1 of the first roller bracket 32 may be positioned in the same straight line with the other end of the center door bracket 20 and an axis on which the first roller bracket 32 is fixed by the center door bracket fixing bolt 25, and the central axis C2 of the second roller bracket 34 may be positioned to be spaced apart from the central axis C1 of the first roller bracket 32 by a predetermined distance. The central axis C1 of the first roller bracket 32 and the central axis C2 of the second roller bracket 34 may be eccentric to be spaced apart from each other by a distance of about 4 mm to about 6 mm.

Since the central axis C1 of the first roller bracket 32 and the central axis C2 of the second roller bracket 34 are eccentric, when the central axis C1 of the first roller bracket 32 is positioned to be retracted toward the inside (interior) of the vehicle compared with the central axis C2 of the second roller bracket 34, as shown in FIG. 5A, the door 2 of the vehicle may be positioned closer to the inside of the vehicle. In addition, when the central axis C1 of the first roller bracket 32 is positioned to be retracted toward the outside (exterior) of the vehicle compared with the central axis C2 of the second roller bracket 34, as shown in FIG. 5B, the door 2 of the vehicle may be positioned closer to the outside of the vehicle.

The first roller bracket 32 may be coupled to the other end of the center door bracket 20 by the center door bracket fixing bolt 25. Since it is possible to loosen the center door bracket fixing bolt 25 to rotate the roller bracket 30 and then tighten the center door bracket fixing bolt 25 again to fix the roller bracket 30, a position of the door 2 in a vehicle width direction may be adjusted by adjusting a rotation amount of the roller bracket 30.

Figure 6:
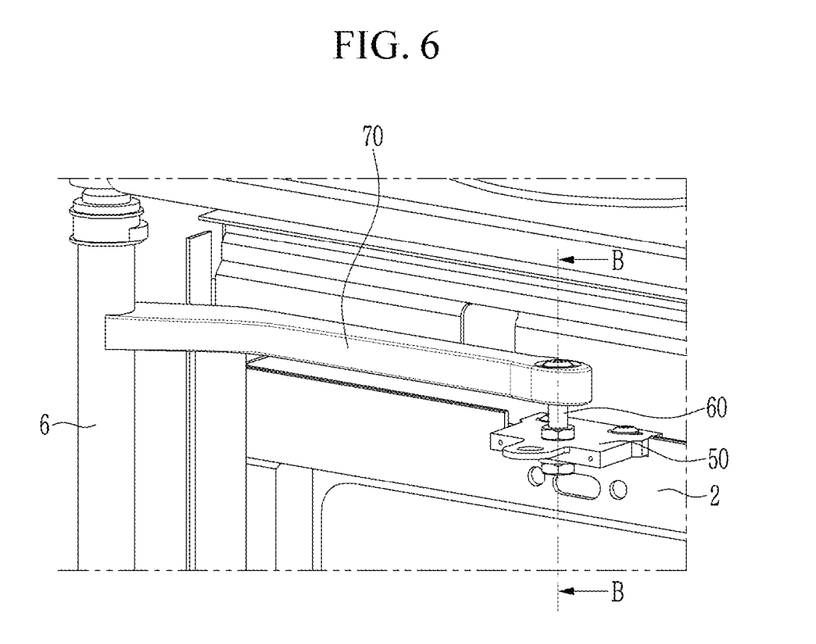
FIG. 6 illustrates an upper portion of a swing-in type of door structure of a vehicle according to an embodiment of the present disclosure.

FIG. 6 illustrates an upper portion of a swing-in type of door structure of a vehicle according to an embodiment of the present disclosure.

Referring to FIG. 6, the swing-in type of door structure of the vehicle according to the embodiment of the present disclosure may further include an upper door bracket 50, a shaft pin 60, and an upper guide arm 70.

The upper door bracket 50 is fixed to an upper surface of the door 2 between the door arm 6 and the center door bracket 20, and may have a plate shape extending toward the inside of the vehicle in a direction perpendicular to the door 2. The shaft pin 60 is mounted in a direction perpendicular to the upper door bracket 50 so as to pass through the upper door bracket 50.

In addition, one end of the upper guide arm 70 may be rotatably coupled to the shaft pin 60, and the other end thereof may be fixed to the door arm 6, so that the upper guide arm 70 extends in a horizontal direction to the door 2.

The shaft pin 60 is inserted into an upper guide arm opening 72 formed in one end of the upper guide arm 70, so that one end of the upper guide arm 70 may be rotated around the shaft pin 60. In addition, the other end of the upper guide arm 70 may be turned in a horizontal direction to the door 2 together with the door arm 6 by rotation of the door arm 6.

Figure 7:
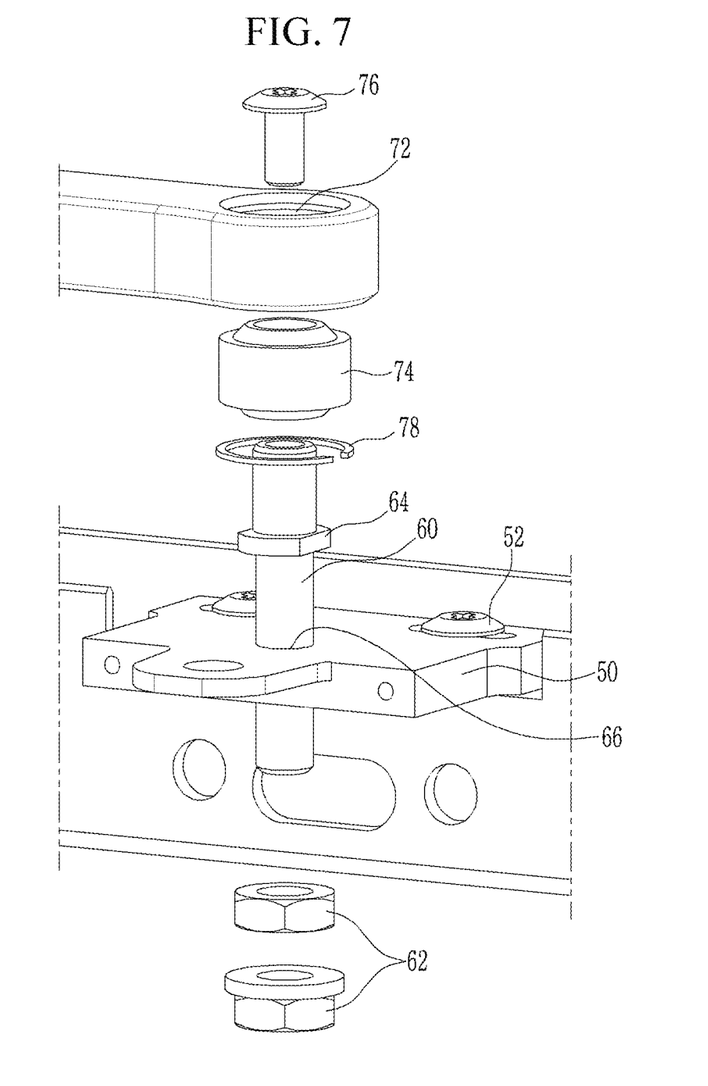
FIG. 7 illustrates a coupling state between an upper door bracket and an upper guide arm of a swing-in type of door structure of a vehicle according to an embodiment of the present disclosure.

FIG. 7 illustrates a coupling state between an upper door bracket and an upper guide arm of a swing-in type of door structure of a vehicle according to an embodiment of the present disclosure.

Referring to FIG. 7, one end of the upper door bracket 50 may be fixed to an upper surface of the door 2 by an upper door bracket fixing bolt 52. In addition, the shaft pin 60 may pass through an upper door bracket opening 66 formed in the upper door bracket 50, and may be screwed by nuts 62 at both sides of the upper door bracket opening 66 to be fixedly mounted on the upper door bracket 50.

The upper guide arm opening 72 into which the shaft pin 60 is inserted is formed at one end of the upper guide arm 70, and the upper guide arm opening 72 may be provided with a rotating joint 74 that is rotated in the upper guide arm opening 72 in a state of being fixed to one end of the shaft pin 60. In addition, one end of the shaft pin 60 and one end of the upper guide arm 70 may be coupled by the shaft pin fixing bolt 76 passing through the upper guide arm opening 72.

On the other hand, one end of the shaft pin 60 may be formed with a locking protrusion 64. When the upper guide arm 70 is coupled to one end of the shaft pin 60, the locking protrusion 64 acts to allow the shaft pin 60 to be locked to an inlet side of the upper guide arm opening 72. In addition, when the upper guide arm 70 is rotated, it is possible to prevent the upper guide arm 70 from being separated toward a lower portion of the shaft pin 60.

In addition, a ring 78 may be interposed between the rotating joint 74 and the locking protrusion 64 to reduce frictional force between the rotating joint 74 and the locking protrusion 64 so that the rotating joint 74 may smoothly rotate.

Figure 8:
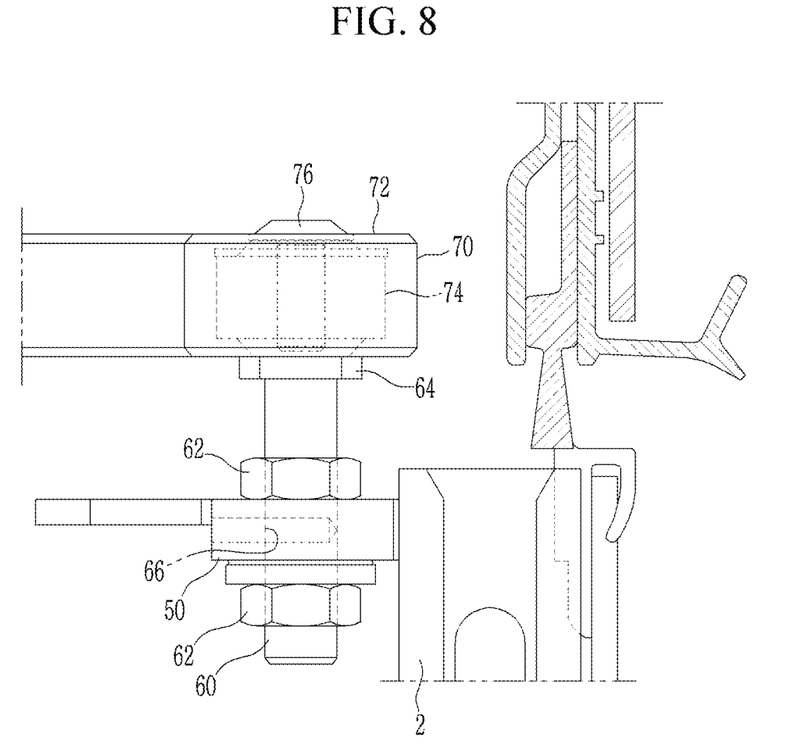
FIG. 8 is a cross-sectional view of an upper portion of a swing-in type of door structure of a vehicle according to an embodiment of the present disclosure, viewed from the side.
Figure 9:
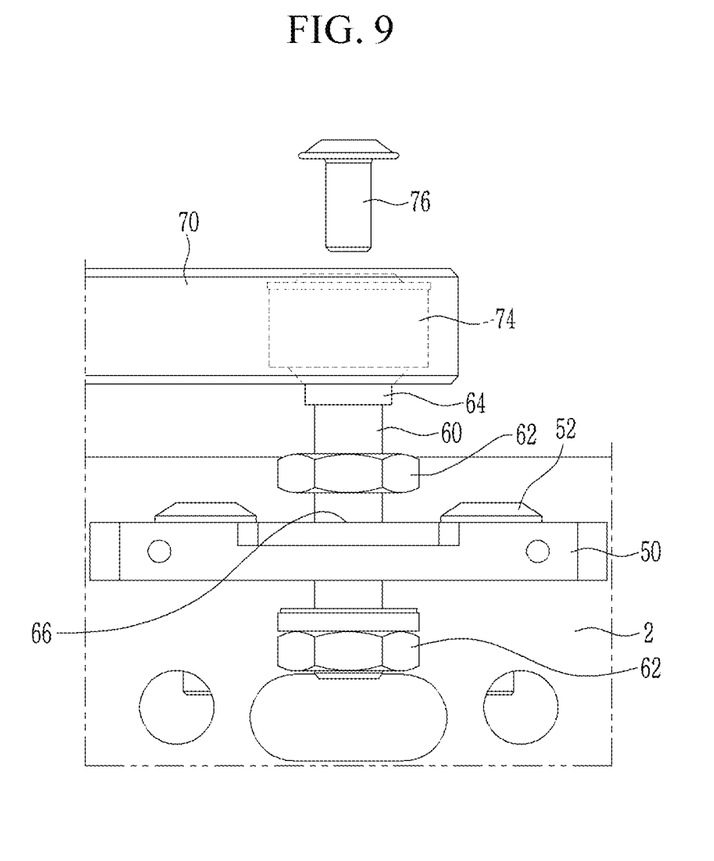
FIG. 9 is a cross-sectional view of an upper portion of a swing-in type of door structure of a vehicle according to an embodiment of the present disclosure, viewed from the inside of the vehicle.

FIG. 8 is a cross-sectional view of an upper portion of a swing-in type of door structure of a vehicle according to an embodiment of the present disclosure, viewed from the side. FIG. 9 is a cross-sectional view of an upper portion of a swing-in type of door structure of a vehicle according to an embodiment of the present disclosure, viewed from the inside of the vehicle.

Referring to FIG. 8 and FIG. 9, one end of the upper door bracket 50 is fixed to an upper surface of the door 2 by the upper door bracket fixing bolt 52, and the shaft pin 60 may be mounted through the upper door bracket opening 66. In addition, the rotating joint 74 is coupled to a circumference of the other end of the shaft pin 60, and the rotating joint 74 may be inserted into the upper guide arm opening 72, so that as the upper guide arm 70 turns, the rotating joint 74 may be rotated within the upper guide arm opening 72.

The shaft pin 60 may be screwed by the nuts 62 at both sides of the upper door bracket opening 66. When the nut 62 is loosened and the shaft pin 60 is rotated, the upper door bracket 50 may vertically move, and as the upper door bracket 50 moves, the door 2 fixed to the upper door bracket 50 may vertically move. Accordingly, by adjusting a degree of insertion of the shaft pin 60 into the upper door bracket 50, a position of the door 2 in a vehicle vertical direction may be adjusted.

Figure 10:
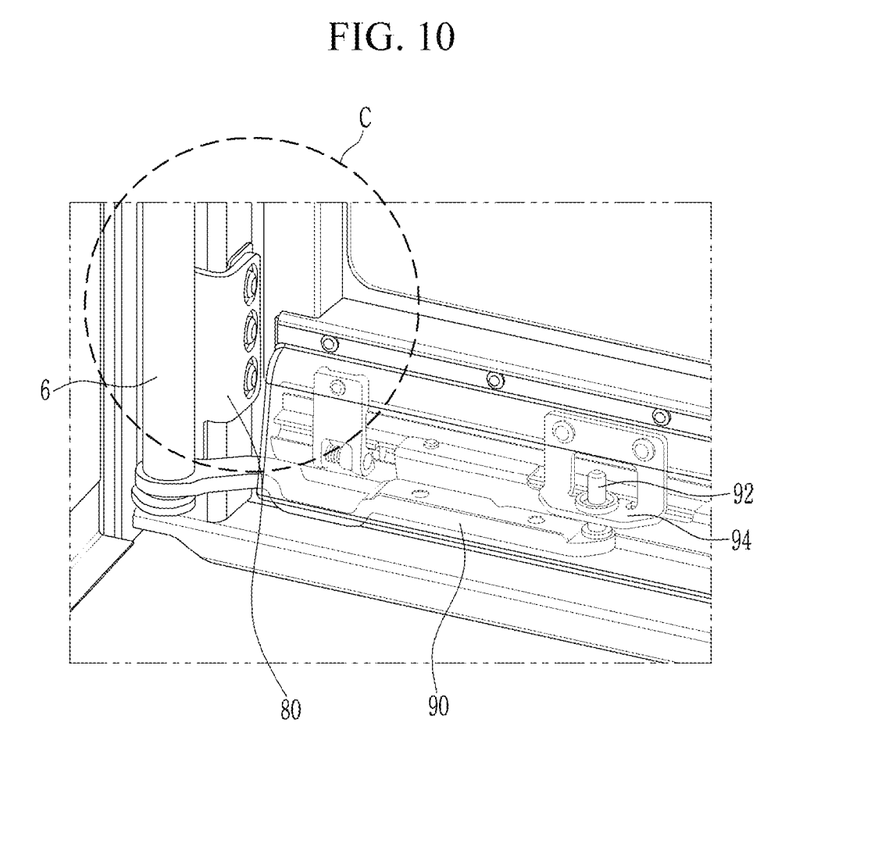
FIG. 10 illustrates a lower portion of a swing-in type of door structure of a vehicle according to an embodiment of the present disclosure.
Figure 11:
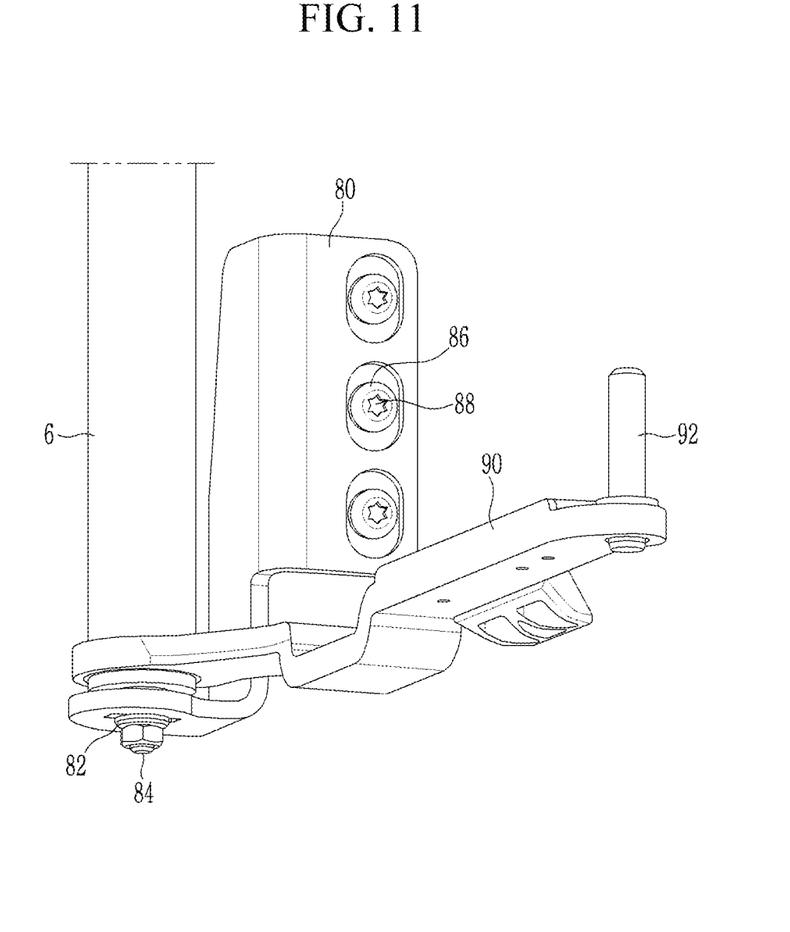
FIG. 11 illustrates a coupling state between a lower door bracket and a lower guide arm of a swing-in type of door structure of a vehicle according to an embodiment of the present disclosure.

FIG. 10 illustrates a lower portion of a swing-in type of door structure of a vehicle according to an embodiment of the present disclosure. FIG. 11 illustrates a coupling state between a lower door bracket and a lower guide arm of a swing-in type of door structure of a vehicle according to an embodiment of the present disclosure.

Referring to FIG. 10 and FIG. 11, the swing-in type of door structure of the vehicle according to the embodiment of the present disclosure may further include a lower door bracket 80 and a lower guide arm 90. One end of the lower door bracket 80 is fixed to a lower side of a vehicle body on the door 2 side, and the other end thereof is coupled to a lower end of the door arm 6. One end of the lower door bracket 80 may be provided in a plate shape, and it may be fixed to a vehicle body surface of the door 2 side of the door by the lower door bracket fixing bolt 88. In addition, the other end of the lower door bracket 80 may be bent from one end of the lower door bracket 80 to be coupled to a lower end of the door arm 6.

One end of the lower guide arm 90 is pivotally coupled to the lower end of the door arm 6 around an axis of the door arm 6, and the other end thereof is fixed to a lower surface of the door 2. One end of the lower guide arm 90 may be interposed between the other end of the lower door bracket 80 and the lower end of the door arm 6 to be rotatably coupled. In addition, the other end of the lower guide arm 90 is provided with a fixing pin 92, and the fixing pin 92 may be rotatably inserted into a fixing pin inserting member 94 provided on the lower surface of the door 2.

On the other hand, an upper long hole 86 is formed in one end of the lower door bracket 80, and a lower door bracket fixing bolt 88 is inserted into the upper long hole 86, so that one end of the lower door bracket 80 may be bolted to the lower side of the vehicle body of the door 2 side and be fixed. A plurality of upper long holes 86 may be provided. When the lower door bracket fixing bolt 88 provided in the upper long hole 86 is loosened to vertically move the lower door bracket 80 and when the lower door bracket fixing bolt 88 is tightened again to fix the lower door bracket 80, a vertical height of the door arm 6 is adjusted, and accordingly, a vehicle vertical height of the lower guide arm 90 connected to the door arm 6 and the door 2 connected to the other end of the lower guide arm 90 may be adjusted.

On the other hand, a lower long hole 82 is formed in the other end of the lower door bracket 80, and a lower guide arm fixing bolt 84 is inserted into the lower long hole 82, so that the lower door bracket 80 and the lower guide arm 90 may be bolted to the lower end of the door arm 6. When the lower guide arm fixing bolt 84 provided in the lower long hole 82 is loosened to move the door arm 6 in a vehicle width direction and when the lower guide arm fixing bolt 84 is tightened again to fix the door arm 6, a vehicle width direction distance of the door arm 6 is adjusted, and accordingly, a distance in the vehicle width direction of the lower guide arm 90 connected to the door arm 6 and the door 2 connected to the other end of the lower guide arm 90 may be adjusted.

As described above, according to the embodiment of the present disclosure, in the swing-in type of door structure of the vehicle, by finely adjusting the step difference of the vehicle door to minimize the gap around the door, it is possible to prevent dust and the like from being introduced into the vehicle, and it is possible to minimize the generation of wind noise.

In addition, by adjusting a bolt or nut, it is possible to easily adjust the step difference in a direction perpendicular to the door and in a vehicle width direction, thereby realizing a watertight structure.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A swing-in type of door structure of a vehicle that includes a door disposed in parallel at both sides of an entrance of the vehicle, and a door arm mounted on one side of the door to open or close the door by rotation, comprising:
   a center door bracket having one end to be fixed to one surface of an upper center of the door and that extends in a direction perpendicular to the door;
   a roller bracket having one end coupled to the other end of the center door bracket in a direction perpendicular to the center door bracket, the roller bracket including:
      a first roller bracket coupled to the center door bracket; and
      a second roller bracket extending integrally with the first roller bracket, wherein a radius of the first roller bracket is larger than a radius of the second roller bracket, and both radii are along a horizontal direction of the vehicle; and
   a roller mounted on the other end of the roller bracket and coupled to be rolled and rotated while in contact with a rail on a vehicle body of an upper side of the door, wherein the second roller bracket is coupled to the roller.

2. The swing-in type of door structure of the vehicle of claim 1, wherein
   a central axis of the first roller bracket is eccentric with respect to a central axis of the second roller bracket.

3. The swing-in type of door structure of the vehicle of claim 2, wherein
   the central axis of the first roller bracket is spaced apart from the central axis of the second roller bracket by a distance of from 4 mm to 6 mm.

4. The swing-in type of door structure of the vehicle of claim 1, further comprising a center door bracket fixing bolt, wherein
one end of the first roller bracket is fixed to the other end of the center door bracket by the center door bracket fixing bolt.

5. The swing-in type of door structure of the vehicle of claim 1, further comprising:
an upper door bracket having one end to fix to an upper surface of the door between the door arm and the center door bracket and extending in a direction perpendicular to the door;
a shaft pin mounted in a direction perpendicular to the upper door bracket so as to pass through the upper door bracket; and
an upper guide arm having one end rotatably coupled to one end of the shaft pin and the other end to fix to the door arm to extend in a horizontal direction to the door.

6. The swing-in type of door structure of the vehicle of claim 5, further comprising an upper door bracket fixing bolt, wherein
the one end of the upper door bracket is to be fixed to the upper surface of the door by the upper door bracket fixing bolt.

7. The swing-in type of door structure of the vehicle of claim 5, wherein
the shaft pin passes through an upper door bracket opening in the upper door bracket, and
the upper door bracket is fixedly mounted by nuts at both sides of the upper door bracket opening.

8. The swing-in type of door structure of the vehicle of claim 6, wherein:
the one end of the upper guide arm has an upper guide arm opening into which the shaft pin is inserted; and
the upper guide arm opening has a rotating joint that is to be rotated in the upper guide arm opening and that is connected to the one end of the shaft pin.

9. The swing-in type of door structure of the vehicle of claim 5, wherein
the one end of the shaft pin has a locking protrusion to allow the shaft pin to be locked to an inlet side of the upper guide arm opening into which the shaft pin is inserted.

10. The swing-in type of door structure of the vehicle of claim 5, further comprising a shaft pin fixing bolt, wherein
the one end of the shaft pin and the one end of the upper guide arm are coupled by the shaft pin fixing bolt.

11. The swing-in type of door structure of the vehicle of claim 1, further comprising:
a lower door bracket having one end to be fixed to a lower side of a door-side vehicle body and the other end to be coupled to a lower end of the door arm; and
a lower guide arm having one end to be rotatably coupled to the lower end of the door arm and the other end to be fixed to a lower surface of the door.

12. The swing-in type of door structure of the vehicle of claim 11, further comprising a lower door bracket fixing bolt, wherein:
the one end of the lower door bracket has an upper long hole; and
the lower door bracket fixing bolt is inserted into the upper long hole so that the lower door bracket is to be fixed to a lower side of the door-side vehicle body.

13. The swing-in type of door structure of the vehicle of claim 11, wherein:
the one end of the lower guide arm is to be interposed and coupled between the other end of the lower door bracket and a lower end of the door arm;
the other end of the lower door bracket has a lower long hole; and
a lower guide arm fixing bolt passes through and is inserted into the lower long hole so that the lower door bracket and the lower guide arm are to be bolted to the lower end of the door arm.

14. The swing-in type of door structure of the vehicle of claim 11, further comprising a fixing pin, wherein:
the fixing pin passes through and is coupled to the other end of the lower guide arm; and
the fixing pin is to be rotatably inserted into a fixing pin inserting member on a lower surface of the door.

\* \* \* \* \*